W. B. HAYDEN.
BALE-TIE.
No. 179,654. Patented July 11, 1876.
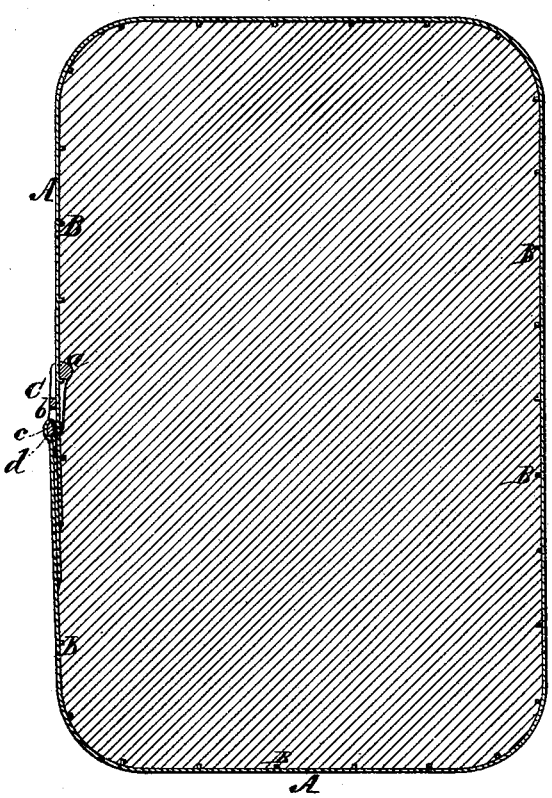
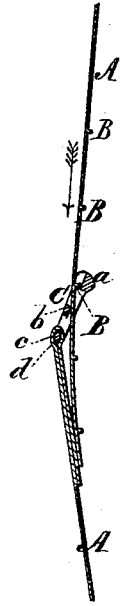
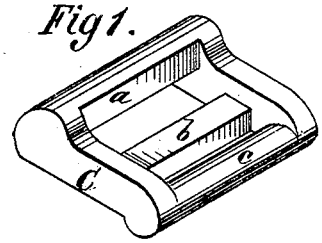
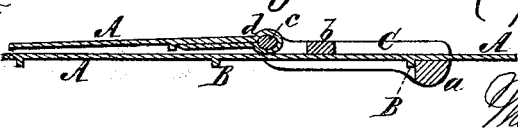
Witnesses:
James Martin Jr.
G. P. Theodore Lang.
Inventor:
William B. Hayden,
by
Mason, Fenwick & Lawrence,
Attys.

UNITED STATES PATENT OFFICE.

WILLIAM B. HAYDEN, OF COLUMBUS, OHIO.

IMPROVEMENT IN BALE-TIES.

Specification forming part of Letters Patent No. 179,654, dated July 11, 1876; application filed June 23, 1876.

*To all whom it may concern:*

Be it known that I, WILLIAM B. HAYDEN, of Columbus, in the county of Franklin and State of Ohio, have invented a new and useful Improvement in Cotton and other Baling Ties and Hoops or Bands; and I do hereby declare that the following is a full, clear, and exact description thereof, reference being had to the accompanying drawings, forming part of this specification, in which—

Figure 1 is a perspective view of the fastening-loop of the hoop or band. Fig. 2 is an inside face view of the hoop or band. Fig. 3 is a longitudinal section of the fastening-loop and the band, the parts being as they appear when being looped around a bale of cotton or hay. Fig. 4 is a similar section to Fig. 3, the parts being as they appear when looped around a bale of hay or cotton. Fig. 5 is a section of a bale of hay or cotton with my improved hoop and loop applied around it.

The nature of my invention consists in the combination of a tie-loop, as hereinafter specified, and iron bale bands or hoops, which are re-enforced and strengthened transversely at the points where the strain comes by projecting ribs, which serve as retaining devices.

To enable others skilled in the art to understand my invention, I will proceed to describe it.

In the accompanying drawings, A represents the metal band or hoop, and B transverse ribs formed on its under surface at proper intervals apart, and entirely around the band, or on a portion thereof, beginning near one end, and terminating at a proper distance therefrom, as found most desirable. I prefer to have the ribs a little shorter than the width of the band, and to provide them throughout the length of the band, excepting that portion where the loop C is attached, and where they might interfere with the doubling of the metal for forming the eye for receiving the back cross-bar of the fastening-loop, and also where they might possibly interfere with the insertion of the fastening end of the band under the loop-holding end of the band after it has passed through the eye of the loop. The ribs embed themselves slightly into the cotton or hay, and prevent the band or hoop from slipping, and also serve as the retaining fastening in connection with the loop.

The loop C is a frame with three cross-bars, $a\ b\ c$. The top surface of the cross-bar $a$ is below the plane of the bottom surface of the cross-bar $b$ a distance equal to the thickness of the band, less the thickness of the ribs B, and the bottom surface of the eye $d$, formed of the metal of the hoop by doubling around the cross-bar $c$, is on a plane with the top surface of bar $a$, and a little below the plane of the bottom surface of bar $b$, as shown.

The band or hoop A and loop C are made secure at the point where they are connected together, either by swaging, welding, brazing, or otherwise uniting the surfaces of the doubled portion. The band or hoop, with loop connected to one of its ends, is placed around the cotton or other bale in the usual manner, and the fastening end of the band or hoop inserted on an angle through the eye of the loop, between the cross-bars $a\ b$, as illustrated in Fig. 3, until the rib which is to form the lock or fastening gets behind the bar $a$, when, the cotton-bale being released from its compressor, the parts are, by the expansion of the cotton, made to assume the condition shown in Figs. 4 and 5, in which condition the rib prevents the band slipping out of the loop.

It will be apparent that when the pressure due to the expansion of the cotton comes against the end of the band which is inserted, this end of the band is caused, by bearing against the eye portion $d'$ of the band, to act as a lever upon that part of the band which bears upon the bar $a$, and a firm contact between the loop and the fastened end of the band maintained. Thus, it will be seen that with the simplest means possible a perfect fastening is provided, and which fastening is very strong, as its retaining device is formed or provided on the hoop or band without perforating the band. Furthermore, the retaining-rib, which is in contact with the loop, is assisted in its work by the numerous other retaining-ribs, which are embedded into the cotton or hay. The bands are also adapted for various-sized bales, as either the first, second, third, or any other proper one of the ribs near the end of the hoop may be used as the rib to bear against the front bar $a$ of the loop.

In the drawings the ribs are shown formed of metal homogeneous with the band metal, and without perforating the band. This construction I adopt, as it avoids weakening the band by rivet-holes or perforations, and is preferable to welding or brazing the ribs upon the band, on account of its greater durability and cheapness.

I, however, do not claim under this application the baling-band or hoop-iron made with its ribs formed in this special manner, as such band or hoop iron I have claimed under another application.

Having described my invention, what I claim, and desire to secure by Letters Patent, is—

The loop C, formed with cross-bars $a$, $b$, and $c$, constructed and arranged as described, in combination with the band or hoop provided with transverse strengthening and retaining ribs on its under surface, substantially as described.

Witness my hand in the matter of my application for a patent for a baling tie or hoop this 20th day of June, 1876.

WILLIAM B. HAYDEN.

Witnesses:
JOHN H. MARTIN,
GEO. W. MEEKER.